United States Patent
Han et al.

(10) Patent No.: US 10,206,160 B2
(45) Date of Patent: Feb. 12, 2019

(54) CROSS-LAYERED RESOURCE ALLOCATION METHOD BASED ON WEIGHTED DESYNC IN WIRELESS AD-HOC NETWORK

(71) Applicant: AGENCY FOR DEFENSE DEVELOPMENT, Daejeon (KR)

(72) Inventors: Myounghun Han, Daejeon (KR); Bongsoo Roh, Sejong (KR); Mijeong Hoh, Daejeon (KR); Chanyi Park, Daejeon (KR); Hyungseok Choi, Sejong (KR); Jungryun Lee, Seoul (KR); Hyunho Choi, Seongnam-si (KR); Jiyoung Jung, Seoul (KR); Youngjae Kim, Seongnam-si (KR); Eutteum Kong, Seoul (KR); Uiseong Yu, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 122 days.

(21) Appl. No.: 15/364,873

(22) Filed: Nov. 30, 2016

(65) Prior Publication Data
US 2017/0295534 A1   Oct. 12, 2017

(30) Foreign Application Priority Data

Apr. 8, 2016  (KR) ......................... 10-2016-0043621

(51) Int. Cl.
*H04W 40/12*  (2009.01)
*H04W 40/26*  (2009.01)

(52) U.S. Cl.
CPC ........... *H04W 40/12* (2013.01); *H04W 40/26* (2013.01)

(58) Field of Classification Search
CPC ............................. H04W 40/12; H04B 17/318
USPC .................................. 370/252–389; 455/436
See application file for complete search history.

(56) References Cited

U.S. PATENT DOCUMENTS

| | | | |
|---|---|---|---|
| 2009/0247164 A1* | 10/2009 | Kandukuri Narayan | H04W 36/30 455/436 |
| 2011/0164527 A1* | 7/2011 | Mishra | H04L 45/123 370/252 |
| 2017/0086158 A1* | 3/2017 | Feng | H04W 56/0015 |

FOREIGN PATENT DOCUMENTS

| | | |
|---|---|---|
| KR | 10-2009-0030685 A | 3/2009 |
| KR | 10-2010-0070662 A | 6/2010 |
| KR | 10-2013-0063916 A | 6/2013 |

(Continued)

OTHER PUBLICATIONS

Kim, Kwangsoo et al., A thesis, "Minimum Bandwidth Securement to Guarantee QoS in Distributed Wireless Resource Allocation using Weighted-DESYNC", (Jun. 2015), pp. 292-293.

(Continued)

*Primary Examiner* — Iqbal Zaidi
(74) *Attorney, Agent, or Firm* — Scully Scott Murphy and Presser (57) ABSTRACT

Provided is a Weighted DESYNC based cross-layered resource allocation method. The method includes, with respect to each of a plurality of nodes constituting a routing path, calculating a link quality value with the next node, receiving a link quality value from at least one neighbor node, and based on the link quality values in the calculating of the link quality value and the receiving of the link quality value, calculating a weight factor for synchronizing a transmission yield.

8 Claims, 5 Drawing Sheets

(56) References Cited

FOREIGN PATENT DOCUMENTS

WO    WO 2010/0028311 A1    3/2010

OTHER PUBLICATIONS

Lee, Nam-Kwon et al., "A Centralized DESYNC Scheme in Small-Scale Wireless Networks", Journal of the Korea Institute of Information and Communication Engineering (Mar. 2015), vol. 19, No. 3, pp. 731-740.
"Weighted DESYNC based Cross-Layer Resource Allocation for Ad-Hoc Network", An article disclosed at Winter Conference, the Korea Institute of Communications and Information Sciences (Jan. 20, 2016).

* cited by examiner

FIG. 1

WIRELESS MULTI-HOP TRANSMISSION ENVIRONMENT

CROSS-LAYERED RESOURCE ALLOCATION METHOD BASED ON WEIGHTED DESYNC IN WIRELESS AD-HOC NETWORK

CROSS-REFERENCE TO RELATED APPLICATION

Pursuant to 35 U.S.C. § 119(a), this application claims the benefit of earlier filing date and right of priority to Korean Application No. 10-2016-0043621, filed on Apr. 8, 2016, the contents of which is incorporated by reference herein in its entirety.

BACKGROUND OF THE INVENTION

1. Field of the Invention

The present invention relates to a message-transmission related resource allocation method in wireless ad-hoc network.

2. Background of the Invention

A desynchronization (DESYNC) theory, which relates to one of biomimetic methods, is a phenomenon having the inverse meaning to a synchronization phenomenon that all fireflies flash periodically at the same time. That is, the DESYNC theory means a phenomenon that all nodes flash at the same time intervals periodically.

At the beginning, a DESYNC method is used in a fully connected network and later, an MH-DESYNC method that message transmission is possible without conflicts between 2-hop neighbor nodes in a multi-hop environment is suggested.

At this point, in order to resolve the performance degradation caused by a bottleneck phenomenon in a wireless multi-hop environment, a weighted-DESYNC (W-DESYNC) method for allocating more time slots by placing a weight on a bottleneck terminal.

When packets are transmitted in a wireless multi-hop environment, a routing is required if terminals are unable to communicate with each other directly.

Figure 1:
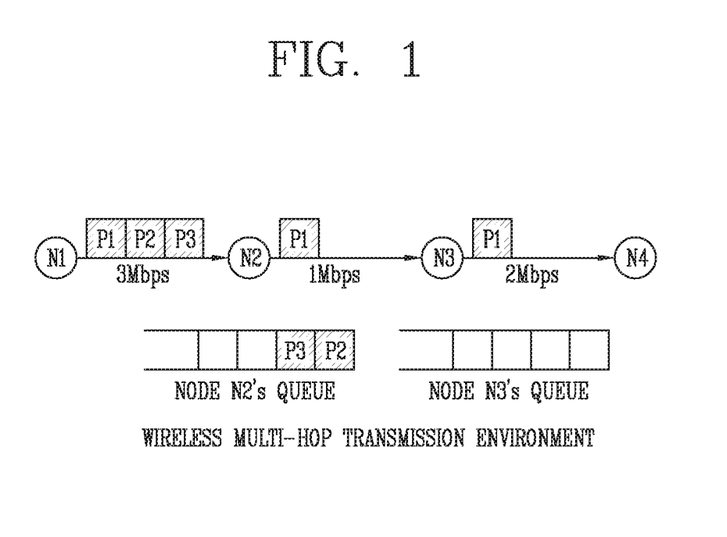
FIG. 1 is a conceptual diagram illustrating an end-to-end transmission yield and delay issue according to a link quality.

FIG. 1 is a conceptual diagram illustrating an end-to-end transmission yield and delay issue according to a link quality.

Referring to FIG. 1, an embodiment for transmitting a packet by using a path determined through a routing is disclosed.

In more detail, a weight factor of each node may be set by the amount of a resource that each node requires. For example, a weight factor of a node N1 may be set to 3; a weight factor of a node N2 may be set to 1; and a weight factor of a node N3 may be set to 2.

Additionally, in relation to a transmission yield that each node is capable of providing, a transmission yield of a link from the node N1 to the node N2 may be set to 3 Mbps; a transmission yield of a link from the node N2 to the node N3 may be set to 1 Mbps; and a transmission yield of a link from the node N3 to a node N4 may be set to 2 Mbps.

In this case, an actual end-to-end transmission yield may be determined by the node N2 and also, a queuing delay may occur in the node N2.

In order to resolve such an issue, a transmission yield between paths is required to be synchronized. However, in the existing W-DESYNC, a weight factor is defined by the desired number of data time slots according to a traffic amount of each node, and such a weight factor definition does not resolve a corresponding issue.

SUMMARY OF THE INVENTION

Therefore, an aspect of the detailed description is to provide a method for determining a weight factor of a weighted-DESYNC (W-DESYNC) method to resolve an end-to-end transmission yield degradation and delay increase caused by a bottleneck terminal on a path in a wireless multi-hop network. This is a method for determining a weight factor for resource allocation to allow all nodes on a path to have the same yield in a wireless multi-hop network through a cross-layered design.

In accordance with to a W-DESYNC based cross-layered resource allocation method in a wireless ad-hoc network according to the present invention, each node defines a link quality by using a signal to noise ratio (SNR) value received through a cross-layered design. Then, a weight factor is calculated to receive a link quality value from 1-hop nodes on a path and synchronize a transmission yield. After this, as W-DESYNC is performed based on a weight factor, the transmission yields of all nodes on a path may be synchronized. Through this, an end-to-end transmission yield may be improved and a queuing delay may be reduced.

To achieve these and other advantages and in accordance with the purpose of this specification, as embodied and broadly described herein, there is provided an embodiment of the present invention provides a Weighted DESYNC based cross-layered resource allocation method, which is performed on each of a plurality of nodes constituting a routing path, including calculating a link quality value with the next node; receiving a link quality value from at least one neighbor node; and based on the link quality values in the calculating of the link quality value and the receiving of the link quality value, calculating a weight factor for synchronizing a transmission yield.

The calculating of the link quality may include calculating a link quality value with the next node on the basis of a signal to noise ratio (SNR) with the next node and an amount of an allocated time slot.

The receiving of the link quality may include receiving a link quality value from at least one neighbor node by a Route Request (RREQ) occurring during a routing process.

The calculating of the weight factor may include calculating the weight factor based on a result obtained by comparing a local average data rate and its own data rate.

The calculating of the weight factor may include calculating the weight factor on the basis of an average of differences between a link quality value of the next node and link quality values received from 1-hop neighbor nodes.

The calculating of the weight factor may include calculating its own firing phase information in the next frame on the basis of firing phase information and weight information received from 2-hop-within-neighbor nodes.

The calculating of the weight factor may include, if there is a node belong to a plurality of paths, performing firing the number of times that the node belongs to the plurality of paths.

The calculating of the weight factor may include using a firing message including Path info for distinguishing a path that the corresponding node belongs.

The path information may include ID information on the next nodes of the corresponding node.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, exemplary embodiments disclosed in this specification will be described in detail with reference to the accompanying drawings, and the same or similar elements are designated with the same numeral references regardless of the numerals in the drawings and their redundant description will be omitted. The suffixes "module" and "unit" for elements used in the following description are given or used interchangeably only for facilitation of preparing this specification, and thus they are not granted a specific meaning or function. In describing exemplary embodiments disclosed in this specification, a specific description for publicly known technologies to which the invention pertains will be omitted when the description is judged to obscure the gist of the embodiments disclosed in the specification. Also, it should be understood that the accompanying drawings are merely illustrated to easily explain exemplary embodiments disclosed in this specification, and therefore, they should not be construed to limit the technical idea disclosed in this specification but be construed to cover all modifications and alternatives falling within the spirit and scope of the present invention.

Although the terms "first," "second," etc., may be used herein to describe various elements, these elements should not be limited by these terms. The above terms are used only to distinguish one component from another.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The singular forms 'a,' 'an,' and 'the' include plural reference unless the context clearly dictates otherwise.

It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

The present invention suggests a method for determining an optimized weight factor so as to improve an end-to-end transmission yield and minimize a queuing delay on a path of W-DESYNC.

In order to improve an end-to-end transmission yield and minimize a queuing delay on a path, it is preferable to synchronize a transmission yield on a path. In order to design such a weight factor, an accurate link quality reception through a cross-layered design should be accompanied.

Figure 2:
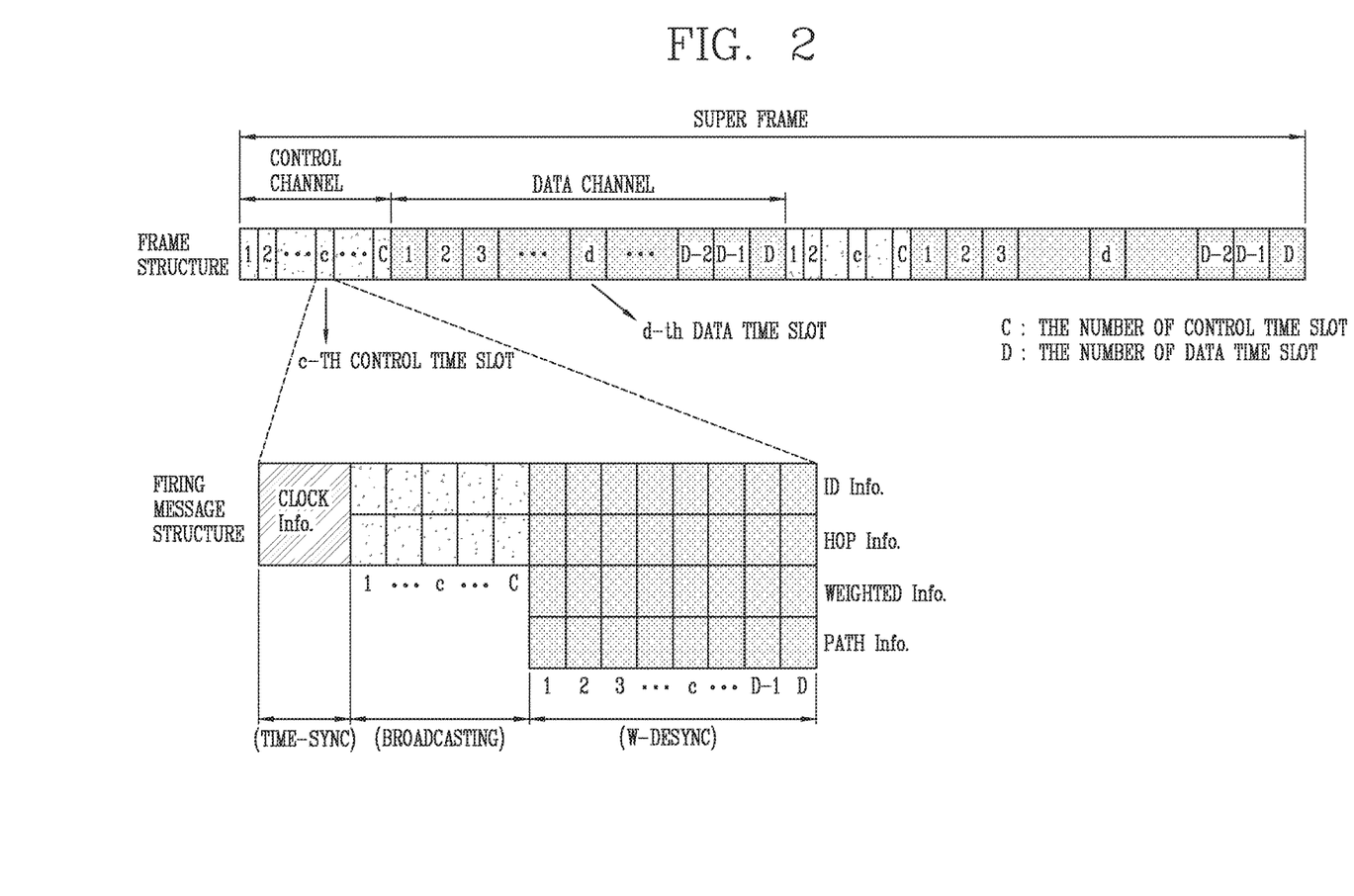
FIG. 2 is a conceptual diagram illustrating a firing message structure according to the present invention.

FIG. 2 is a conceptual diagram illustrating a firing message structure according to the present invention.

Referring to FIG. 2, in order to resolve a conventional technique issue, a firing message structure is complemented. In more detail, Path info is added to a firing message used in existing W-DESYNC.

Path info, as information necessary for distinguishing a path that a corresponding node belongs, may include ID information of the following next node on a path with respect to a corresponding node in ID info.

Figure 3:
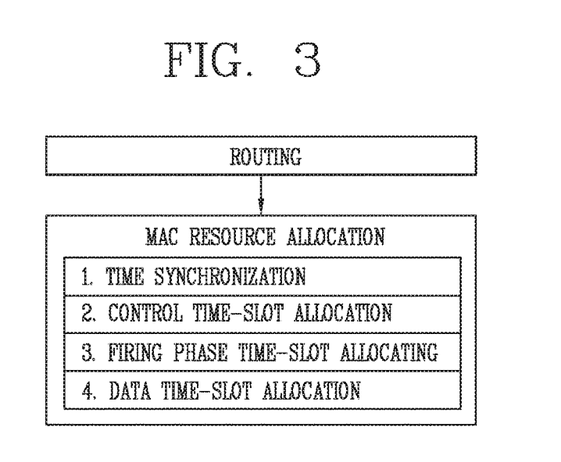
FIG. 3 is a flowchart illustrating a resource allocation method according to the present invention.

FIG. 3 is a flowchart illustrating a resource allocation method according to the present invention.

Referring to FIG. 3, in order to use a newly suggested weight factor, a firing phase time slot occupation method (step 3) and a data time slot occupation method (step 4) will be improved from a logical firing method of an existing distributed biomimetic resource allocation method (for example, MH-DESYNC) after routing. In more detail, a transmission yield of a node on a path is to be synchronized through a weighted-DESYNC (W-DESYNC) method. As a result, an end-to-end transmission yield may be improved and a queuing delay may be minimized.

In order to describe a resource allocation method according to the present invention, first, a link quality will be defined.

A node i may receive a signal to noise ratio (SNR) to the next node j on a path through a cross-layered design. At this point, the SNR considers transmission power, noise power, and path loss.

Through $SNR_i$ received in such a manner and the amount of a time slot that the node i receives (for example, bandwidth $BW_i$), based on Shannon's Theorem, a link quality $d_{i,j}$ between the node i and the node j may be defined as the following Equation 1.

$$d_{i,j} = BW_i \times \log_2(1+SNR_{i,j}) \qquad \text{[Equation 1]}$$

Figure 4:
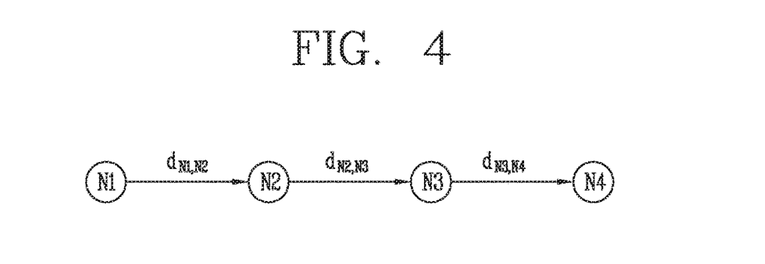
FIG. 4 is a conceptual diagram illustrating a link quality reception method according to the present invention.

FIG. 4 is a conceptual diagram illustrating a link quality reception method according to the present invention.

Referring to FIG. 4, a link quality is received through RREQ occurring from a routing process from a node N1 to a node N4.

At this point, based on a node N2, the node N2 may receive $d_{N1,N2}$ received from the node N1, $d_{N2,N3}$ that the node N2 itself transmits to a node N3, and $d_{N3,N4}$ that the node N2 overhears when the node N3 transmits information to the node N4.

Here, the overhearing refers to a case that when the node N3 transmits RREQ to the node N4, the node N2 receives RREQ that is not the information that the node N3 transmits to the node N2.

Then, the definition of a weight factor will be described. For this, first, the condition of a weight factor may be defined by the following Equation 2.

$$0 < w < w_{max} \quad \text{[Equation 2]}$$

In order to operate normally according to the equation of W-DESYNC, a weight factor should be greater than 0. Moreover, in order to prevent a specific terminal from monopolizing a resource, it should not have a too large value.

Accordingly, in terms of a structure, when a transmission yield of a node is less than a local average data rate, a weight factor should be increased, and when a transmission yield of a node is greater than a local average data rate, a weight factor should be decreased.

Figure 5:
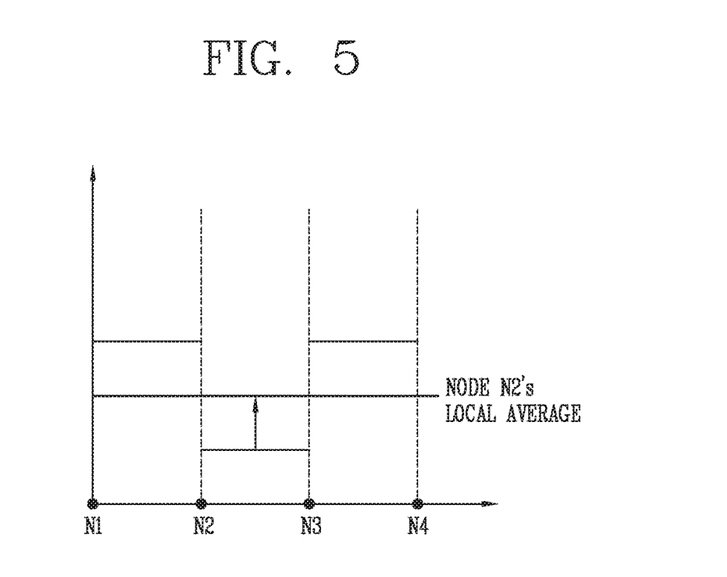
FIG. 5 is a conceptual diagram illustrating the condition of a weight factor according to the present invention.

FIG. 5 is a conceptual diagram illustrating the condition of a weight factor according to the present invention.

Referring to FIG. 5, based on the node N2, since a data rate of the node N2 is lower than its Local average data rate, a weight factor $w_{N2}(t)$ should be increased.

When a weight factor is designed, a set of 1-hop neighbor nodes of the node i may be defined as $N_1(i)$ and a weight factor of the node i in a frame t may be defined as $w_i(n)$. Accordingly, in a frame t+1, a weight factor $w_i(n+1)$ of the node i is defined as the following Equation 3 through $d_i(n)$ obtained through Equation 1 and $d_j(n)$ of a 1-hop neighbor node j ($j \in N_1, j \neq i$).

$$\omega_i(n+1) = \omega_i(n) + \frac{1}{|N_1|} \sum_{j \in N_1, j \neq i} (d_j(n) - d_i(n)) \quad \text{[Equation 3]}$$

Through the Equation 3, after calculating an average of differences between a link quality $d_i(t)$ and a link quality $d_j(n)$ received from 1-hop neighbor nodes to a weight factor $w_i(n)$ of the node i in a frame n, the node i may determine whether to increase or reduce the weight factor $w_i(n)$ and then, apply it to a weight factor $w_i(n+1)$ in a frame n+1.

In relation to a W-DESYNC based cross-layered resource allocation method according to the present invention, an embodiment of an update method when a node belongs to one path will be described below.

In the W-DESYNC method, each node i calculates forward mid and backward mid values through firing phase information and weighted information of 2-hop neighbor nodes that each node i receives.

For example, if a node i receives a firing message of a node k, forward mid and backward mid values may be calculated by the following Equation 4 through firing phase information $\phi_i$ and a weight factor $w_i(n)$ of the node i and firing phase information $\phi_k$ and a weight factor $w_k(n)$ of the node k. At this point, the weight factor is calculated through the Equation 3.

$$\phi_k = \text{floor}\left|\phi_i - \frac{\omega_i}{\omega_k + \omega_i}(\phi_i - \phi_k - 1)\right| + 1 \quad \text{[Equation 4]}$$

$$\phi_k = \text{floor}\left|\phi_i + 1 + \frac{\omega_i}{\omega_i + \omega_k}(\phi_k - \phi_i - 1)\right|$$

Here, the first equation means Forward Mid and the second equation means Backward Mid.

When Firing phase information of a forward node having the greatest influence on itself is defined as $\phi_{forward}$ and its weight factor is defined as $w_{forward}$, and firing phase information of a backward node having the greatest influence on itself is defined as $\phi_{backward}$ and its weight factor is defined as $w_{backward}$, its firing phase information in the next frame may be calculated by the following Equation 5.

$$\phi_i'(D) = \\ \text{round}\left|\frac{\omega_{forward} + \omega_i}{\omega_{forward} + \omega_{backward} + 2\omega_i}(\phi_{backward} - \phi_{forward})\right| + \\ \phi_{forward} \quad \text{[Equation 5]}$$

At this point, the node occupies a resource from a forward mid value of its forward node to a backward mid value of its backward node. In synchronizing a transmission yield, each path calculates a weight factor and synchronizes a transmission yield, separately.

In relation to a W-DESYNC based cross-layered resource allocation method according to the present invention, an embodiment of an update method when two or more nodes belong to one path will be described below.

When one node belongs to two or more paths, as firing is performed the number of times that the node belongs to paths, a separate resource may be allocated to each path. For this, the above-defined firming message structure becomes required.

In more detail, when firing is performed on one node several times, in order to calculate a weight factor that matches each path, a distinction on which path each firing belongs to is required. For this, additional data, that is, new Path Info, is to be included in a firing message and transmitted.

If the node i is a node that performs firing more than two times, a weight factor of the node i is defined as $w_i^j(n)$. j is the ID of the next node to be transmitted of the node i.

Figure 6:
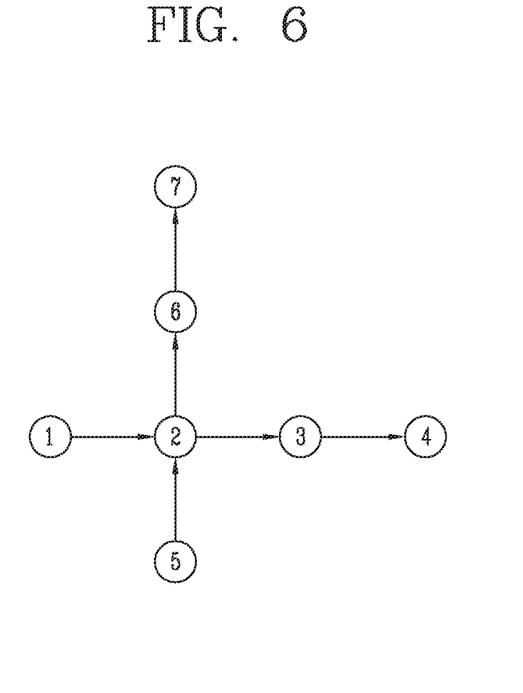
FIG. 6 is a conceptual diagram illustrating an operation of a node having two or more paths.

FIG. 6 is a conceptual diagram illustrating an operation of a node having two or more paths.

Referring to FIG. 6, in relation to two paths 1-2-3-4 and 6-2-6-7 as a node 2 used in the both paths performs firing two times, one frame receives a data time slot used in the path 1-2-3-4 and a data time slot used in the path 6-2-6-7 separately.

Additionally, a weight factor $w_2^3(n)$ of the node 2 used in the path 1-2-3-4 and a weight factor $w_2^6(n)$ of the node 2 used in the path 6-2-6-7 are calculated separately.

Figure 7:
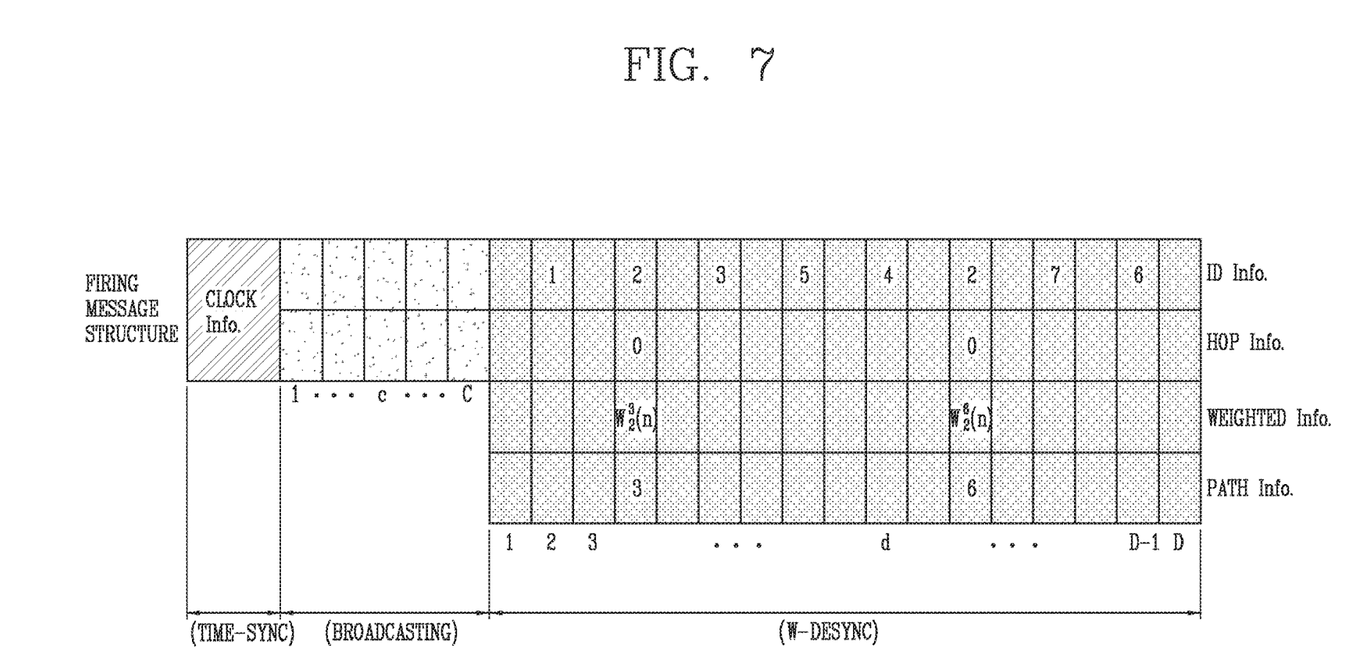
FIG. 7 is a conceptual diagram illustrating path information included in a firing message structure according to the present invention.

FIG. 7 is a conceptual diagram illustrating path information included in a firing message structure according to the present invention.

Referring to FIG. 7, as described with reference to FIG. 6, the node 2 performs firing two times according to the number of overlapping paths, and during each firing, is required to distinguish which path each firing belongs to in order to match a transmission yield in each corresponding path.

For this, the firing message structure includes each Path Info and inserts the ID of a node 6 and the ID of a node 3 to each Path Info.

In a wireless ad-hoc network according to the present invention, the effect of a W-DESYNC based cross-layered resource allocation method will be described as follows.

In a wireless ad-hoc situation, when a node itself receives an allocated resource through W-DESYNC, in order to determine an optimized weight factor, the node may receive a transmission yield on a path through a cross-layered design.

Then, as a weight factor is determined based on the received information in such a manner, it is possible to synchronize the transmission yields of all nodes on a path. As a result, an end-to-end transmission yield may be improved and a queuing delay may be minimized.

The invention can also be implemented as computer-readable codes in a computer-readable recording medium. The computer-readable recording medium is any data storage device that can store data which can thereafter be read by a computer system. Examples of the computer-readable recording medium include a Hard Disk Drive (HDD), a Solid State Disk (SSD), a Silicon Disk Drive (SDD), a ROM, a RAM, a CD-ROM, a magnetic tape, a floppy disk, and an optical data storage. Further, the record medium may be implemented in the form of a carrier wave (e.g., Internet transmission). Therefore, the foregoing detailed description is to be regarded as illustrative and not restrictive. The scope of the present invention should be determined only by the reasonable interpretation of the appended claims so as to encompass all such modifications and equivalents.

What is claimed is:

1. A Weighted DESYNC based cross-layered resource allocation method, wherein the method is performable on each of a plurality of nodes constituting a routing path, the method comprising:
    calculating a link quality value with a next node of a predetermined node of the plurality of nodes;
    receiving a link quality value from at least one neighbor node of the predetermined node; and
    based on the link quality values in the calculating of the link quality value and the receiving of the link quality value, calculating a weight factor for synchronizing a transmission yield,
    wherein the calculating of the weight factor comprises calculating the weight factor based on an average of differences between a link quality value of the next node and link quality values received from 1-hop neighbor nodes of the predetermined node.

2. The method of claim 1, wherein the calculating of the link quality comprises calculating a link quality value with the next node on the basis of a signal to noise ratio (SNR) with the next node and an amount of an allocated time slot.

3. The method of claim 2, wherein the receiving of the link quality comprises receiving a link quality value from the at least one neighbor node by a Route Request (RREQ) occurring during a routing process.

4. The method of claim 3, wherein the calculating of the weight factor comprises calculating the weight factor based on a result obtained by comparing a local average data rate with the data rate of the predetermined node.

5. The method of claim 1, wherein the calculating of the weight factor comprises calculating the firing phase information of the predetermined node in the next frame on the basis of firing phase information and weight information received from 2-hop-within-neighbor nodes of the predetermined node.

6. The method of claim 1, wherein the calculating of the weight factor comprises, if there is a node belong to a plurality of paths, performing firing the number of times that the node belongs to the plurality of paths.

7. The method of claim 6, wherein the calculating of the weight factor comprises using a firing message including Path info for distinguishing a path that the corresponding node belongs.

8. The method of claim 7, wherein the path information comprises ID information on the next nodes of the corresponding node.

* * * * *